Figure 1:
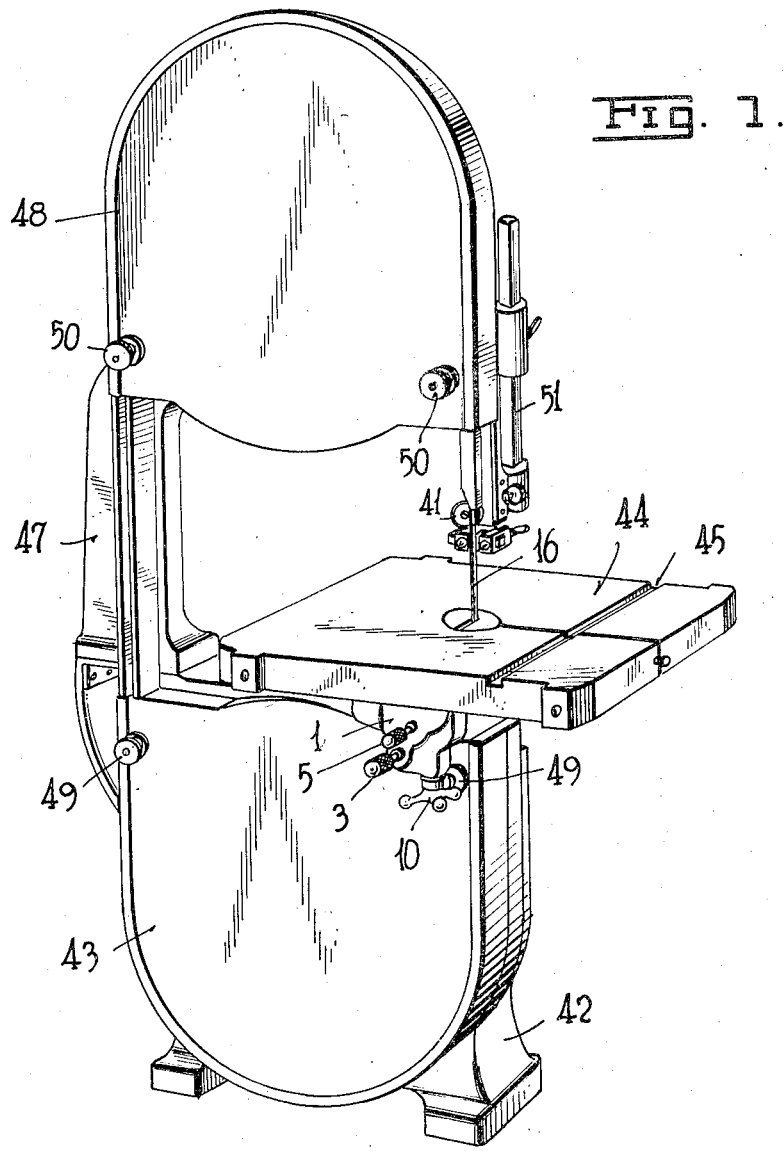

March 19, 1940. H. E. TAUTZ 2,193,946
EXTENSION CONTROL MEANS FOR TOOL GUIDES
Filed Nov. 23, 1936 3 Sheets-Sheet 1

Inventor
Herbert E. Tautz,
By Carl A. Hellmann,
Attorney

Inventor
Herbert E. Tautz,
By Carl A. Hellmann,
Attorney

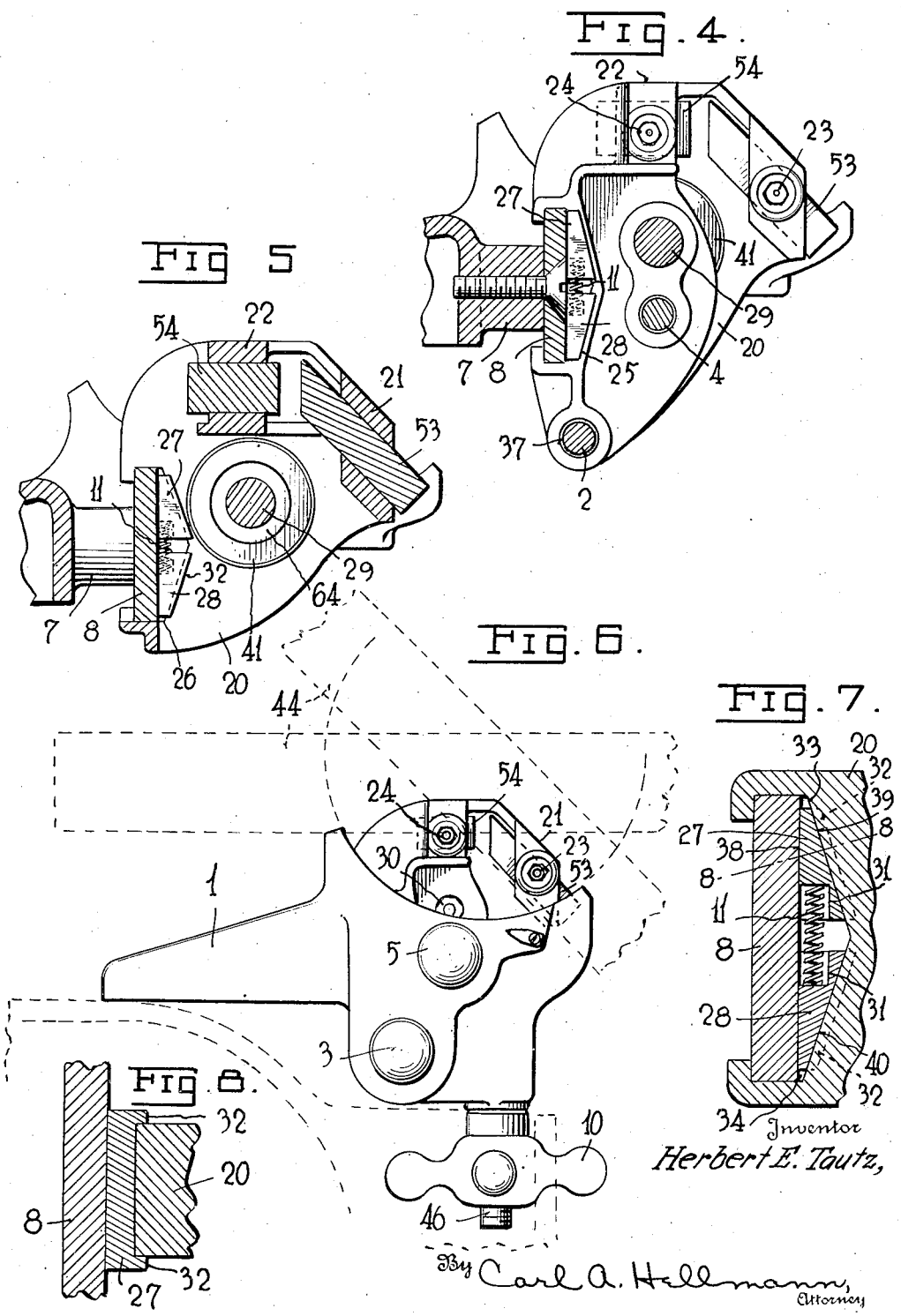

Patented Mar. 19, 1940

2,193,946

UNITED STATES PATENT OFFICE 2,193,946

EXTENSION CONTROL MEANS FOR TOOL GUIDES

Herbert E. Tautz, Milwaukee, Wis., assignor to Delta Manufacturing Company, Milwaukee, Wis.

Application November 23, 1936, Serial No. 112,410

2 Claims. (Cl. 143—160)

The present invention relates to means for controlling machine parts ordinarily difficult of access by means of extension devices terminating at convenient points adjacent the machine table or the like, thus increasing the ease and safety of making certain adjustments.

More specifically, one form of the invention relates to means for controlling the lower saw guide in a band saw, particularly one of the type disclosed in my prior Patent No. 2,032,233, dated February 25, 1936, for Band saw guides.

In a copending case Serial No. 23,759, filed May 27, 1935, now Patent No. 2,108,086, dated February 15, 1938, a device of this same general nature is disclosed and the present case relates to certain improvements in such structures.

Another feature of the present invention relates to providing a guide support for the band saw blade beneath the saw table and of such nature that it may be placed closely adjacent the lower surface of the said table without interfering with the tilting of the table. Such guide when located as close as possible to the lower surface of the table will support the saw blade much more satisfactorily against twisting and yielding than when placed a considerable distance below the table as heretofore common. This construction is shown also in Patent 2,108,086 mentioned in the preceding paragraph, but is not claimed therein, nor in the present case, but in a separate case, Serial No. 224,202, filed August 10, 1938, for "Saw guides", and constituting a continuation of the present case.

In the band saw disclosed in said prior Patent No. 2,032,233 the lower saw guide, which is located under the table in the customary manner, is, of course, not so readily accessible as the upper saw guide and this may lead to difficulty or even danger of injury in the hands of inexperienced users, who in groping beneath the saw table might accidentally come in contact with moving parts.

The underlying idea of the present invention consists in providing operating rods extending forward from the lower saw guide, that is, toward the operator of the machine, and of sufficient length to provide convenient access from the front of the table.

Still more specifically, the invention consists in a slidable saw guide mounted upon a suitable way or ways, and having an operating means extending forwardly therefrom for moving such guide along said ways, said saw guide being provided further with a second operating means for making possible a further additional type of adjustment of the saw guide.

A particular object of the present invention is to provide a self-adjusting slide carrying certain working parts wherein the stiffness of the fit of one part sliding on the other is automatically maintained uniform so as to eliminate the need for manual adjusting and take up any lost motion or wear throughout the useful life of the mechanism. Such adjusting mechanism is, of course, also of more general application and not necessarily restricted to use in the specific environment in which it is disclosed in the present case.

Other objects and advantages of the present invention will in part be specifically set forth in the present specification and partly will be obvious from the disclosure.

Figure 2:
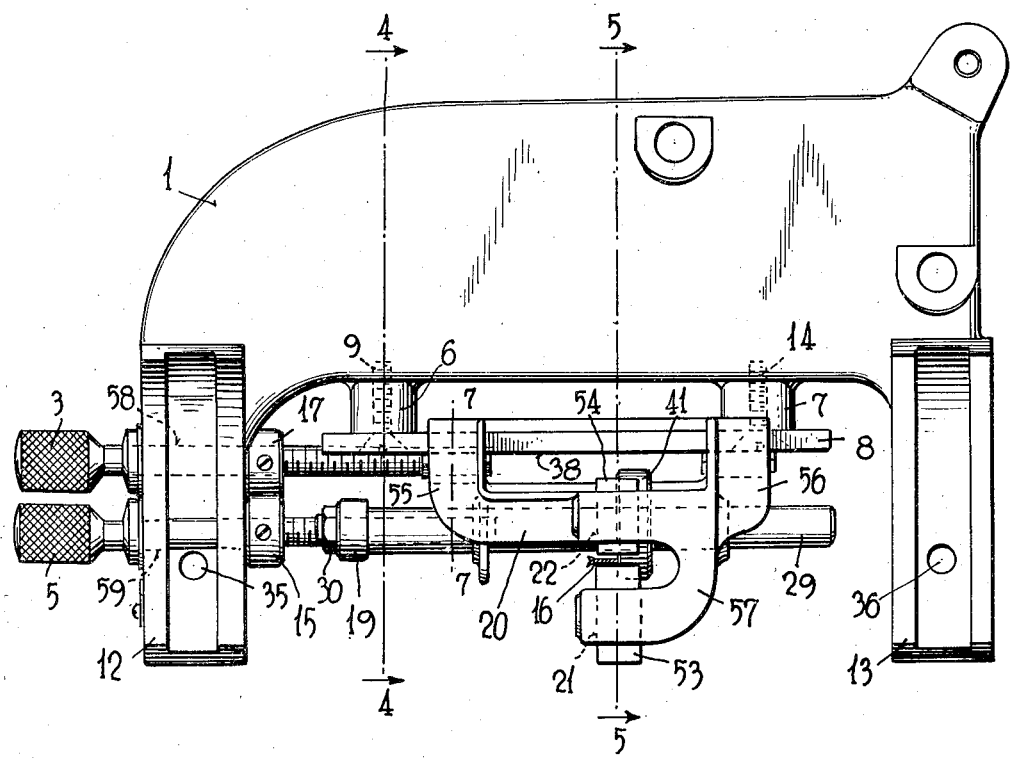
Figure 3:
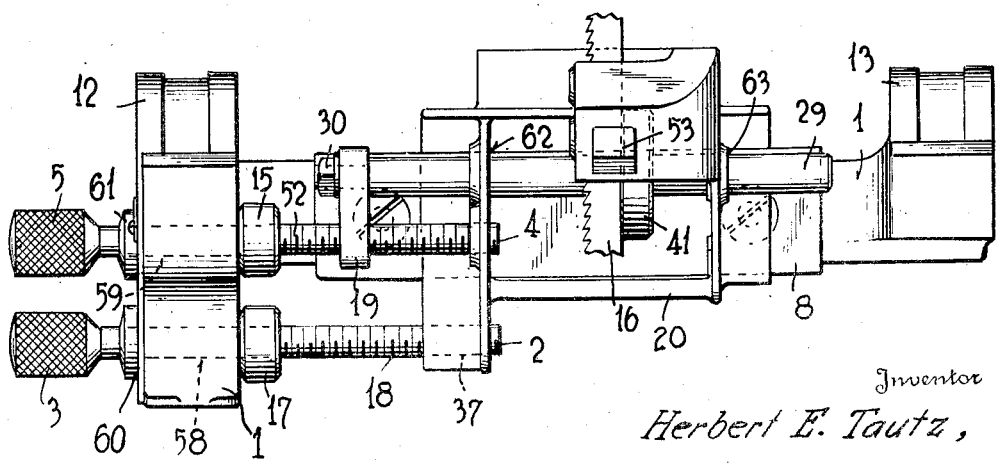

One embodiment of the invention is described in said specification and illustrated in the accompanying drawings, wherein:

Fig. 1 is a perspective view of a band saw illustrating one way of utilizing the present invention, Fig. 2 is a top plan view of a supporting bracket for the table of the band saw illustrated in Fig. 1, Fig. 3 is an elevation of said bracket as seen from the right, Fig. 4 is a section through a portion of the bracket and associated parts on the plane indicated by the line 4—4 of Fig. 2, Fig. 5 is a section through a portion of the bracket and associated parts on the plane indicated by the line 5—5 of Fig. 2, Fig. 6 is a front elevation of the said bracket with the table indicated in two different positions by dotted lines, Fig. 7 is a section on the plane indicated by the line 7—7 of Fig. 2 partly broken away and on a much larger scale to show the structure of the slide and the self-adjusting wedge type jaws bearing on the same and Fig. 8 is a section on the plane indicated by the line 8—8 of Fig. 7.

In all the figures corresponding parts are indicated by similar reference characters.

Referring first to Fig. 1 which shows a band saw to which my invention is applied, the band saw consists of a lower frame 42 having an upper frame 47 secured thereto, these frames, respectively, carrying the shields 43 and 48 held thereto by the nuts 49 and 50. The saw blade is shown at 16 and 44 in the saw table, having the gage guiding slot 45 therein. The upper saw blade guide as a whole is designated by reference character 51, while the lower guide for the saw blade comprises parts held by the bracket 1 which also has formed therein the bearings for the trunnions about which the table 44 may pivot. 10 designates a star wheel which when loosened permits such pivotal adjustment of the table 44, and 3 and 5 are the operating knobs for adjusting the lateral guides and end thrust bearing respectively for the saw blade 16. With this general description of the band saw as a whole, the remaining structure will be more clearly understood as to its function and location.

Figs. 2 and 3 show the structure of the lower guide on a larger scale. The bracket 1 carries the trunnion bearings 12 and 13 at its front and rear respectively, these bearings having holes 35 and 36 therein for the securing means to hold the trunnions (not shown) of the table 44 in adjustably securable position.

The bracket 1 may have a forward lug 6 and a rear lug 7 to which the slide plate 8 is secured in any desired way, as by the flat head screws 9 and 14 respectively. It will be observed that the heads of the screws are preferably either flush with the surface 38 of the slide plate 8 or depressed somewhat below said surface so as to leave such surface unobstructed.

A sliding bracket 20 is arranged to be carried by said slide plate 8 and has two spaced arms 55 and 56, so that when said arms engage the plate 8 they will afford a definite alinement of the bracket 20 with respect to the plate 8 and the bracket 1 carrying said plate. The sliding bracket 20 also has a preferably U-shaped portion as shown at 57, having the two arms thereof directed forwardly, that is, to the left in Fig. 2, these arms providing sockets 21 and 22 which receive the lateral thrust bearings 53 and 54 which are arranged on opposite sides of the saw blade 16 and restrict its lateral play.

These guide blocks or lateral bearings may be secured in their adjusted positions in their respective sockets by means of the headless set screws 23 and 24 best shown in Fig. 6. While it is not necessary that these set screws be of the headless type, it is found to be preferable to use this kind of set screw as it affords a very secure grip and is not readily deranged accidentally.

A threaded rod 2 having a head or operating knob 3 thereon passes freely through a suitable hole 58 in the front portion of the bracket 1 and carries at the rear end of such hole a stop member or collar 17 secured to the rod 2 in any desired way, as by a screw or the like, the rod 2 having threads 18 formed thereon engaging in a threaded aperture 37 formed in a suitable portion of the sliding bracket 20, as shown best in Fig. 3.

The rod 2 turns freely in the hole 58 whereby upon rotation of the knob 3 the threaded portion 18 working in the corresponding threads 37 will shift the bracket 20 as a whole forward and back with respect to the bracket 1, since the rod 2 is restrained against axial motion by reason of the collar 17 and a flange 60 engaging on opposite sides of a portion of the bracket 1. Such motion of the bracket 20 will serve to shift the lateral bearings 53 and 54 in a forward and back direction.

A second rod 4 having a head or knob 5 and a collar 15 similar to the corresponding parts 3 and 17, and a flange 61 similar to the flange 60, passes through a hole 59 in the bracket 1. The rod 4 has a screw threaded portion 52 engaging in a correspondingly threaded aperture in the cross-piece 18 which has secured thereto, by means of nut 30, a rod 29 extending parallel to the slide plate 8.

The rod 29 passes freely through suitable apertures 62 and 63 in the sliding bracket 20 and has secured thereto the stationary member or inner cone 64, of a ball thrust bearing 41 whose outer member is thus freely rotatable about said cone, but is secured against axial shifting along the rod 29. The forward surface of the rotatable outer member of the ball bearing 41 serves as a rear-thrust bearing for the saw blade 16 whose rear edge bears against the front thereof, as shown best in Figs. 2 and 3.

Upon referring to Figs. 4, 5 and 6 the structure and arrangement of the various parts already enumerated will be more clearly understood. It will be noted that the right hand lateral thrust bearing block 53 is arranged at an angle of 45° to the vertical, whereas the left hand block 54 is substantially horizontal. This arrangement makes it possible to pivotally tilt the table 44 downward to the extent of 45° about the trunnion bearings without interfering with said right hand lateral thrust-bearing block.

It will be seen also from Figs. 4, 5 and 6 that by constructing the parts as described above, it will be possible to minimize the distance between the top surface of the table 44 and the tops of the thrust bearing blocks 53 and 54, so that thus the saw blade will be positively guided at a location as near as possible to the lower surface of the table and the unsupported distance between the tops of such thrust bearing blocks and the top surface of the table 44 will be a minimum so that there is less opportunity for the saw blade to twist or yield. It is found in practice that the average user of the band saw will arrange the upper guide somewhat above the top surface of the workpiece so that in general the saw blade will be supported at approximately equal distances above and below the workpiece and this may be considered the best adjustment, for avoiding unsymmetrical shifting of the blade and for minimizing the difference in the cuts followed by the blade at the top and bottom of the workpiece.

An important feature of the present invention resides in the means for causing the sliding bracket 20 to be maintained always with the same degree of stiffness against the track on which it slides, namely, the slide plate 8. This result is attained by means of a pair of wedges 27 and 28 shown in section in Fig. 7 and in elevation in Figs. 4 and 5.

It will be noted that each wedge 27 or 28 bears with one surface against the face 38 of the slide plate 8 and with its other surface, inclined thereto at a suitable angle, against the surfaces 39 and 40 respectively, formed in the bracket 20. Each wedge 27 and 28 has flanges 32 at its edges to prevent the wedge from moving in a direction parallel to the length of the slide plate 8, and to retain the wedges on the correspondingly shaped portion of the bracket 20.

Each wedge also has a suitably shaped cavity 31 at its thick end and when said cavities are opposed to one another as shown in Fig. 7 they provide room for housing a helical spring 11 which is engaged in said cavities and prevented from escaping. Said spring forces the wedges 27 and 28 apart, causing them to bear against the slanting surfaces 39 and 40 and consequently also against the surface 38 of the slide plate 8.

Suitable clearance should be provided at the corners or ends 33 and 34 to compensate for any wear of the parts in service. A cavity is formed at 25 and another at 26 in the respective ends of the two arms 55 and 56 of the bracket 20 to accommodate the wedges and spring as will be understood from Fig. 2 in conjunction with Figs. 4 and 5. Fig. 8 shows diagrammatically how the flanges 32 keep the wedges from becoming disengaged from the bracket 20.

Referring to the operation of the mechanism above described it will be noted that the upper guide 51, being readily accessible from above the table may be adjusted very easily to bring the end thrust rear bearing and the two side bearings for the saw blade 16 into proper position to cooperate correctly with the work table 44 in sawing workpieces placed on said table. In the ordinary band saw, however, the lower guide is difficult to reach inasmuch as all the component bearings are located either on both sides of the saw blade 16 or behind the same, and for this reason the present device greatly facilitates such adjustment.

Manipulation of the knob 3 will bring the two side thrust bearings 53 and 54 forward or back to cooperate correctly with the saw blade 16 while manipulation of the knob 5 will bring the rear thrust bearing 41 into proper contact with the rear edge of the saw blade. It will be understood, of course, that the side thrust bearings 53 and 54 may be adjusted manually once for all by loosening the set screws 23 and 24 and shifting the blocks 53 and 54 so as to just clear the side faces of the saw blade 16, whereupon the blocks may be held securely in their adjusted positions by again tightening the said set screws.

These various guides and thrust bearings are secured to the bracket 1 and, therefore, remain in their adjusted positions when the table tilts, since the table is movable independently of said bracket 1.

In the earlier form of slide employed for adjusting the bracket 20, disclosed and claimed in my copending case Serial Number 23,759, the wear on the slide plate and associated parts was compensated by a sliding key adjustable by set screws so as to take up the wear and while this construction is completely operative and very satisfactory, nevertheless it requires taking up of the set screws from time to time and meanwhile the stiffness of the sliding connection varies with the amount of wear.

In the present type this adjustment is made unnecessary by the wedges 27 and 28, which are forced apart by the spring 11 and which by reason of their more or less slight taper produce a relatively great thrust in response to the relatively slight tension of the spring 11. It is obvious that any minor irregularities in the surface of the plate 8 will not cause any obstruction or variation in the stiffness of the sliding fit since the wedges will yield against the force of the spring.

By reason of the cavities 31 provided in the wedges it is possible to accommodate a relatively long spring 11 therein which results in several advantages, one being the fact that the tension of the spring remains more nearly constant in spite of slight compressions or extensions thereof, due to its length and the possibility of suitably pre-tensioning it and, second, the cavities 31 form a secure retainer for the spring when the wedges are placed in position in the bracket 20 and bear against the surface 38 of the plate 8.

The exact angle or taper of the wedges is unimportant, but an angle substantially such as that disclosed in the present drawings has been found very satisfactory. The clearances left at 33 and 34 respectively allow considerable wear of the wedges to take place without having their ends strike the inside of the bracket 20 so that this wedge structure will ordinarily serve throughout the life of the machine without any attention or replacement.

The materials of which the various cooperating parts, namely, the plate 8, the wedges 27 and 28, and the bracket 20 are made, need not be any definite ones, although a very satisfactory construction results when the plate 8 is made of soft or machinery steel and the bracket 20 of suitable cast metal, such as cast iron, for example, while the wedges 27 and 28 are made of other materials, preferably metallic, such as Babbitt metal, brass, bronze or the like, which has relatively satisfactory anti-friction characteristics with respect to the metal or metals of which the plate 8 and bracket 20 are made.

The wedges 27 and 28 need not, however, be made of metal, but if preferred could also be made of fiber or of some plastic product, for example, a phenol-formaldehyde condensation product or similar artificial resin, or even of a suitable hard wood. The plastic product or metal, of course, has a great advantage in that it may be cast or molded ready for use, thus dispensing with any machining operations.

While this wedge-and-spring structure has been described as applied to the operating means for a band saw guide, it is of course obvious that it will be eminently suitable for many other uses in connection with machinery in general and it will therefore be understood that the present invention is not confined to band saws or similar tools.

Attention is also directed to a point of difference between the structure described in the present case and that of the former case Serial Number 23,759, namely, in the present case both of the screw-threaded rods 2 and 4 remain longitudinally fixed when rotated and serve to shift respectively the bracket 20 and the rod 29. In the prior case, however, one of the rods, namely, the rod designated as 4 in said case, carries the thrust ball bearing for the saw blade 16 directly, so that the rod 4 itself must move longitudinally forward and back when its operating knob 5 is turned, thus bringing the said knob 5 correspondingly forward or back and failing to preserve a fixity of relationship between the two knobs 3 and 5.

This disadvantage has been overcome in the present case by having both rods 2 and 4 turn freely in suitable bores 58 and 59 in the bracket 1, while maintaining them against axial shift by the collars 17 and 15, the active shifting of the bracket 20 and rod 29 being accomplished by means of screw threaded apertures formed in parts rigidly connected with each of said structures and engaged on the threaded ends of the rods 2 and 4, as shown clearly in Fig. 3.

Having disclosed my invention and described it in connection with one particular embodiment thereof it will, of course, be obvious that changes may be made in various features and details thereof without departing from the spirit of the invention and, therefore, said invention is defined solely by the following claims.

I claim:

1. A band saw having a frame and a saw blade, a carriage, said carriage having two spaced housings, means for guiding the carriage, comprising a guide track supported by the said frame, a pair of wedges in each housing, each said pair of wedges engaging both the said track and the corresponding housing, the wedges of each pair having their thin ends directed away from one another, and resilient means between the butt ends of the wedges of each pair to force the said wedges apart to cause them to maintain uniform frictional engagement between the track and the movable carriage, and guides for the saw blade carried by the said carriage.

2. A band saw having a frame and a saw blade, a carriage, said carriage having two spaced housings, means for guiding the carriage, comprising a guide track supported by the said frame, said housings having surfaces inclined with respect to said track, yieldable means in each housing, comprising a pair of members each having a pair of faces at an angle to one another corresponding to the angle between the said inclined surfaces and the track, and spring means interposed between said members to cause them to bear against said surfaces and track to engage both the said track and the corresponding housing, to cause the said means automatically to exert substantially constant pressure therebetween and thus maintain uniform frictional engagement between the track and the movable carriage, and also to compensate for any wear between said track and carriage, and guides for the band saw blade carried by the said carriage.

HERBERT E. TAUTZ.